US010678300B2

(12) United States Patent
Perelli et al.

(10) Patent No.: US 10,678,300 B2
(45) Date of Patent: Jun. 9, 2020

(54) MULTI-FOLD COMPUTING DEVICE

(71) Applicant: Lenovo (Singapore) Pte. Ltd., Singapore (SG)

(72) Inventors: Thomas Perelli, Raleigh, NC (US); Ali Kathryn Ent, Raleigh, NC (US); Cuong Huy Truong, Cary, NC (US); Matthew Ian Tucker, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/396,579

(22) Filed: Dec. 31, 2016

(65) Prior Publication Data

US 2018/0188775 A1    Jul. 5, 2018

(51) Int. Cl.
*G06F 1/16* (2006.01)

(52) U.S. Cl.
CPC ............ *G06F 1/1618* (2013.01); *G06F 1/166* (2013.01); *G06F 1/169* (2013.01); *G06F 1/1637* (2013.01); *G06F 1/1662* (2013.01); *G06F 1/1681* (2013.01)

(58) Field of Classification Search
CPC ...... G06F 1/1616; G06F 1/1681; G06F 1/166; H04M 1/0214; H04M 1/0216; H04M 1/0218; H04M 1/022; H04M 1/0222; H04M 1/0225; H04M 1/0227; H04M 1/0229; H04M 1/0231; H04M 1/0233; H04M 1/0247

See application file for complete search history.

(56) References Cited

U.S. PATENT DOCUMENTS

| | | | | |
|---|---|---|---|---|
| 4,068,095 A | * | 1/1978 | Ghormley | G06F 1/1626 379/444 |
| 5,416,730 A | * | 5/1995 | Lookofsky | G06F 1/163 361/679.02 |
| 5,490,036 A | * | 2/1996 | Lin | G06F 1/1616 361/679.11 |
| 5,739,810 A | * | 4/1998 | Merkel | G06F 1/1616 345/156 |
| 5,808,862 A | * | 9/1998 | Robbins | G06F 1/162 361/679.09 |
| 6,256,192 B1 | * | 7/2001 | Shannon | G06F 1/1616 312/223.2 |
| 6,353,529 B1 | * | 3/2002 | Cies | G06F 1/1616 248/917 |
| 6,392,871 B1 | * | 5/2002 | Yanase | G06F 1/162 345/905 |
| 6,421,235 B2 | * | 7/2002 | Ditzik | G06F 1/1616 320/114 |
| 6,430,038 B1 | * | 8/2002 | Helot | G06F 1/1616 248/917 |
| 6,593,859 B1 | * | 7/2003 | Watanabe | G06F 1/1616 341/20 |
| 6,612,668 B2 | * | 9/2003 | Doan | G06F 1/1616 16/303 |

(Continued)

*Primary Examiner* — Adrian S Wilson
(74) *Attorney, Agent, or Firm* — Brian J. Pangrle

(57) ABSTRACT

An apparatus can include a processor; memory accessible by the processor; a display housing that includes a display operatively coupled to the processor; a keyboard housing; a palm rest housing; a first hinge assembly that operatively couples the keyboard housing to the display housing; and a second hinge assembly that operatively couples the palm rest housing to the keyboard housing.

18 Claims, 9 Drawing Sheets

(56) References Cited

U.S. PATENT DOCUMENTS

| | | | | |
|---|---|---|---|---|
| 6,643,124 B1* | 11/2003 | Wilk | G06F 1/1616 | 312/223.1 |
| 6,825,415 B1* | 11/2004 | Chen | F16M 11/10 | 174/50 |
| 7,136,282 B1* | 11/2006 | Rebeske | G06F 1/1616 | 345/1.1 |
| D551,223 S * | 9/2007 | Luminosu | D14/320 | |
| 7,492,891 B2* | 2/2009 | Eldon | G06F 1/1616 | 379/433.12 |
| 7,587,225 B2* | 9/2009 | Kim | H04M 1/0214 | 455/575.1 |
| 7,864,517 B2* | 1/2011 | Miller | G06F 1/1618 | 345/1.1 |
| 7,974,084 B2* | 7/2011 | Chen | G06F 1/1616 | 361/679.21 |
| 8,203,832 B2* | 6/2012 | Szabolcsi | G06F 1/1616 | 248/917 |
| 8,208,249 B2* | 6/2012 | Chin | G06F 1/1618 | 361/679.27 |
| 8,310,823 B2* | 11/2012 | Stoltz | G06F 1/1616 | 361/679.08 |
| 8,624,844 B2* | 1/2014 | Behar | G06F 1/162 | 345/168 |
| 8,803,816 B2* | 8/2014 | Kilpatrick, II | G06F 1/1616 | 345/173 |
| D719,542 S * | 12/2014 | Lee | D14/138 AB | |
| 8,958,201 B2* | 2/2015 | Leung | G06F 1/1626 | 361/679.27 |
| D767,578 S * | 9/2016 | Wong | D14/455 | |
| 9,507,376 B2* | 11/2016 | Kontkanen | G06F 1/1624 | |
| 9,625,952 B2* | 4/2017 | Holung | G06F 1/1681 | |
| 2001/0030850 A1* | 10/2001 | Ditzik | G06F 1/1616 | 361/679.3 |
| 2002/0114131 A1* | 8/2002 | Forlenza | G06F 1/1616 | 361/679.4 |
| 2002/0141146 A1* | 10/2002 | Mustoe | G06F 1/1616 | 361/679.04 |
| 2003/0021086 A1* | 1/2003 | Landry | G06F 1/1616 | 361/679.27 |
| 2003/0142474 A1* | 7/2003 | Karidis | G06F 1/1616 | 361/679.06 |
| 2006/0056143 A1* | 3/2006 | Tatsukami | G06F 1/16 | 361/679.09 |
| 2006/0067037 A1* | 3/2006 | Yin | G06F 1/1616 | 361/679.27 |
| 2006/0089182 A1* | 4/2006 | Gartrell | E05D 1/02 | 455/575.3 |
| 2007/0103859 A1* | 5/2007 | Yu | G06F 1/1616 | 361/679.55 |
| 2007/0117600 A1* | 5/2007 | Robertson, Jr. | H04M 1/0216 | 455/575.3 |
| 2007/0217131 A1* | 9/2007 | Kehr | G06F 1/162 | 361/679.27 |
| 2008/0232054 A1* | 9/2008 | Chen | G06F 1/1616 | 361/679.07 |
| 2008/0300031 A1* | 12/2008 | Cho | H04M 1/0216 | 455/575.3 |
| 2009/0086424 A1* | 4/2009 | Jette | G06F 1/1601 | 361/679.55 |
| 2009/0201254 A1* | 8/2009 | Rais | G06F 1/1613 | 345/168 |
| 2010/0053876 A1* | 3/2010 | Widmer | G06F 1/1616 | 361/679.27 |
| 2010/0064536 A1* | 3/2010 | Caskey | G06F 1/1616 | 33/303 |
| 2010/0157518 A1* | 6/2010 | Ladouceur | G06F 1/1616 | 361/679.09 |
| 2010/0271771 A1* | 10/2010 | Wu | G06F 1/1616 | 361/679.17 |
| 2010/0277856 A1* | 11/2010 | Stoltz | G06F 1/1616 | 361/679.06 |
| 2010/0321877 A1* | 12/2010 | Moser | G06F 1/1616 | 361/679.29 |
| 2012/0194448 A1* | 8/2012 | Rothkopf | A45C 13/002 | 345/173 |
| 2012/0307423 A1* | 12/2012 | Bohn | G06F 1/1641 | 361/679.01 |
| 2012/0327580 A1* | 12/2012 | Gengler | G06F 1/1626 | 361/679.09 |
| 2013/0031289 A1* | 1/2013 | Yeh | G06F 1/1632 | 710/303 |
| 2013/0227836 A1* | 9/2013 | Whitt, III | H01H 13/704 | 29/622 |
| 2013/0242490 A1* | 9/2013 | Ku | G06F 1/1626 | 361/679.3 |
| 2014/0160654 A1* | 6/2014 | Yoo | G06F 1/1637 | 361/679.12 |
| 2015/0160739 A1* | 6/2015 | Truong | G06F 1/1662 | 345/168 |
| 2017/0102740 A1* | 4/2017 | Kuscher | G06F 1/1618 | |
| 2017/0277228 A1* | 9/2017 | Wong | G06F 1/1618 | |

* cited by examiner

MULTI-FOLD COMPUTING DEVICE

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a processor; memory accessible by the processor; a display housing that includes a display operatively coupled to the processor; a keyboard housing; a palm rest housing; a first hinge assembly that operatively couples the keyboard housing to the display housing; and a second hinge assembly that operatively couples the palm rest housing to the keyboard housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
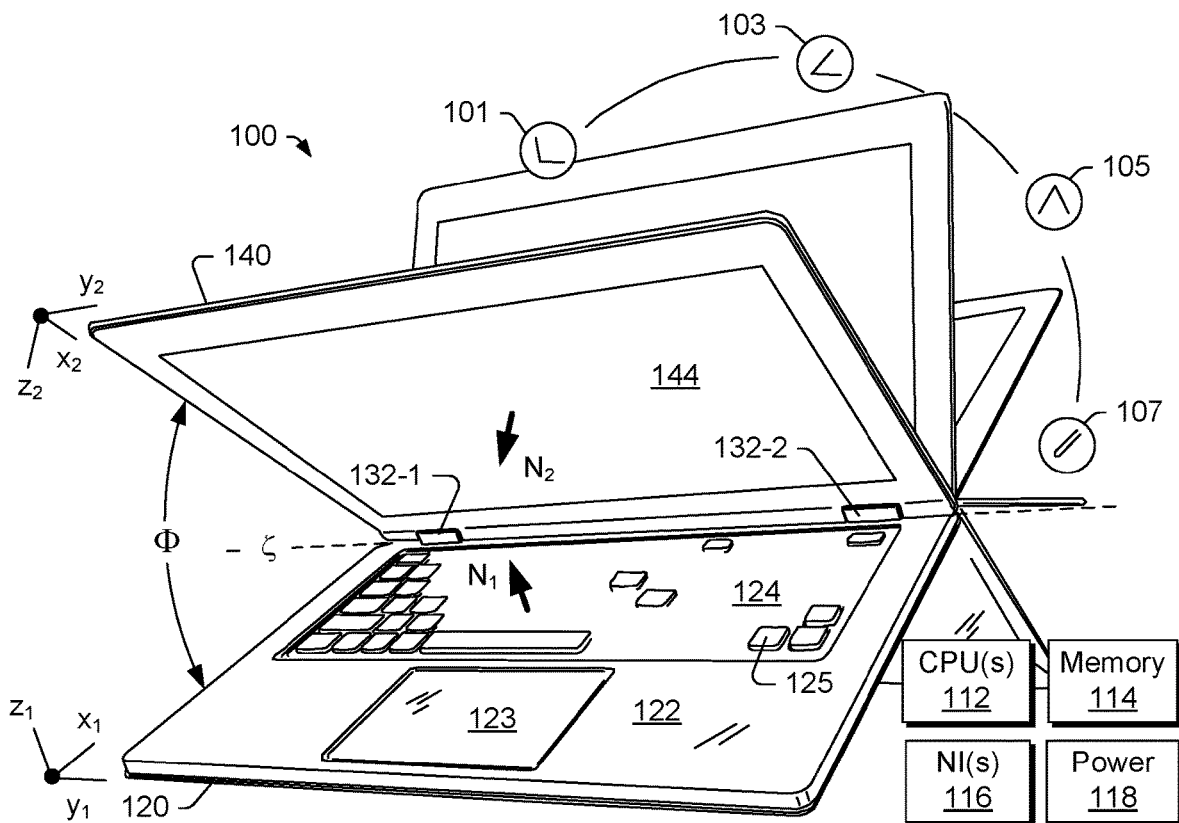
FIG. 1 is a diagram of an example of a device.
Figure 1:
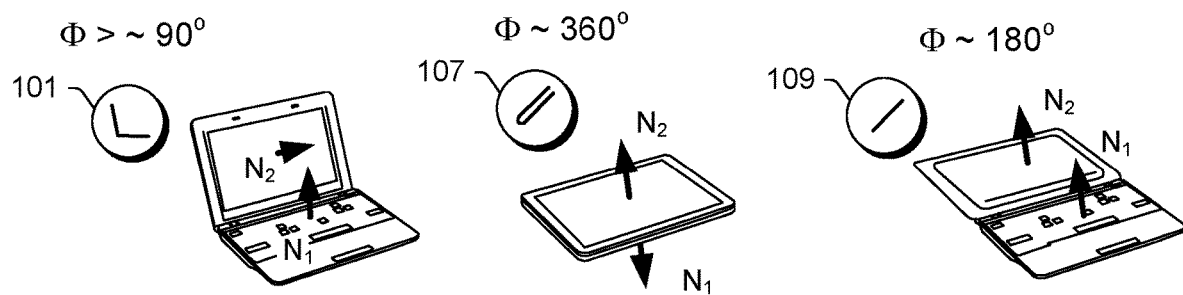

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display. In such an approach, a user may spin the keyboard housing by 180 degrees about a central axis of the single hinge (e.g., an axis orthogonal to the axis $\zeta$) and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Various scenarios exist where a fixed footprint computing device may be suboptimal, ergonomically. For example, where a fixed footprint of a computing device is too big to use in a limited space such as some airline seat situations, a user may refrain from using the computing device. Alternatively, a user may utilize the device in a tablet orientation, if possible; noting that a tablet orientation can be at times cumbersome where a user wants to hold the computing device with one hand for lengths at a time. For example, consider a user that is checking patients in a medical services setting, a user that is taking inventory in a warehouse or other commercial setting, etc. In such settings, a user may desire to hold the computing device with one hand while having the other hand free to move objects, enter touch input, utilize a stylus, a scanner, etc. As various computing devices aim to be sleek, a user may have to apply hand force sufficient to provide friction between surfaces of the computing device and the user's hand, which may or may not be in a glove, where, for the latter instance, the user must be aware of the friction of the outer surface of the glove (e.g., an possibly the inner surface of the glove that is in contact with the user's hand). While a suction-cup, strap or other type of mountable handle may be available as an accessory that can be attached to the computing device to enhance gripability, such an approach too may be suboptimal.

Various types of computing devices include flat, thin plate that can hinge away from the back side of a display. For example, the SURFACE PRO 3™ computing device (Microsoft Corporation, Redmond, Wash.) includes a flat, thin plate (e.g., about 1 mm to about 2 mm in thickness) that is a portion of the back side of the computing device (opposite a display side). Such a flat, thin plate can be uncomfortable to grasp or uncomfortable when placed in contact with a user's body, for example, when resting a user's leg or legs due to the weight of the device being concentrated along such a thin edge.

As mentioned, in an orientation such as the orientation 107, where keys of a keyboard face outwardly in the direction of the vector $N_1$, the keys may come into contact with a surface such as that of a table, a desk, etc. In such an orientation, keys resting on a surface (e.g., or users legs) can pick-up dirt, germs, debris, etc. Keys may also be pressed, scratched, etc.

As an example, a computing device can include an adjustable footprint. For example, a computing device can include a palm rest housing that is foldable. In such an example, a hinge assembly can allow for folding the palm rest housing where the fold may be made between the palm rest housing and a keyboard housing.

As an example, a keyboard and touchpad side of a laptop can be formed in a foldable manner, for example, to have a fold just below the keys dividing the keyboard from the touchpad. In such an example, the touchpad portion (e.g., and/or palm rest portion or palm rest housing) may be foldable in a unidirectional manner (e.g., approximately 180 degrees clockwise or counter-clockwise) or in a bidirectional manner (e.g., approximately 180 degrees in clockwise and counter-clockwise directions).

As an example, a device can include different folding modes. For example, in one folding mode, a keyboard of a keyboard housing can be on top and a palm rest housing where a back side of the palm rest housing can be a contact surface that may be in contact with a user's legs (e.g., a user's lap). In such a folding mode, the footprint of the device (per the palm rest housing) may be approximately half the size of the keyboard housing plus the palm rest housing when in a planar orientation, which, in the folding mode, ergonomically, the device can fit well on a small table or one or more other tight laptop use scenarios.

As an example, in a folding mode, a device can include a step or shoulder that can be utilized as a feature to enhance gripping by a hand or hands. For example, where a palm rest housing is folded with a keyboard housing to form a stack and then the stack is folded onto a back side of a display housing, the thickness of the palm rest housing and the keyboard housing (e.g., as stacked) can form a step or shoulder with respect to the back side of the display housing. Such a step or shoulder may be centrally located on the back side of the display housing when the device is in a tablet mode. Such a step or shoulder forms a grip for a user's hand or hands. As an example, a user can place one or more of four fingers against the step or shoulder, as an edge to grip/press against (e.g., apply force thereto). In such a folding mode (e.g., a tablet mode or tablet orientation), the formed grip may also reduce the amount of display area of a display of the display housing that a thumb may cover (e.g., on the front side of the display housing).

As an example, one or more folding modes of a device can provide a relatively flat surface that can rest against a user's leg or legs while a display of a display housing of the device is directed toward a user's face. For example, a keyboard housing and a palm rest housing in a planar orientation can be rotated with their back sides toward the back side of the display housing such that the keyboard housing and the palm rest housing in a planar orientation and the display housing form an acute angle (e.g., an angle less than 90 degrees). In such an example, the keyboard side of the keyboard housing and the palm rest side of the palm rest housing may be relatively flat surfaces that can rest against a user's leg or legs. Where such a device includes a hinge assembly between the keyboard housing and the palm rest housing, the footprint may be reduced by folding the palm rest housing onto the keyboard housing in either a palm rest to keyboard orientation, which would cover the keys of the keyboard, or a back side of the palm rest housing to back side of the keyboard housing orientation, which would have the keys of the keyboard exposed. In the palm rest to keyboard orientation, the keys of the keyboard may be protected from contact with a surface (e.g., or users legs), which may reduce risk of the keyboard picking-up dirt, germs, debris, etc. Such an orientation may help protect the keys of the keyboard from being pressed, scratched, etc.

Figure 2:
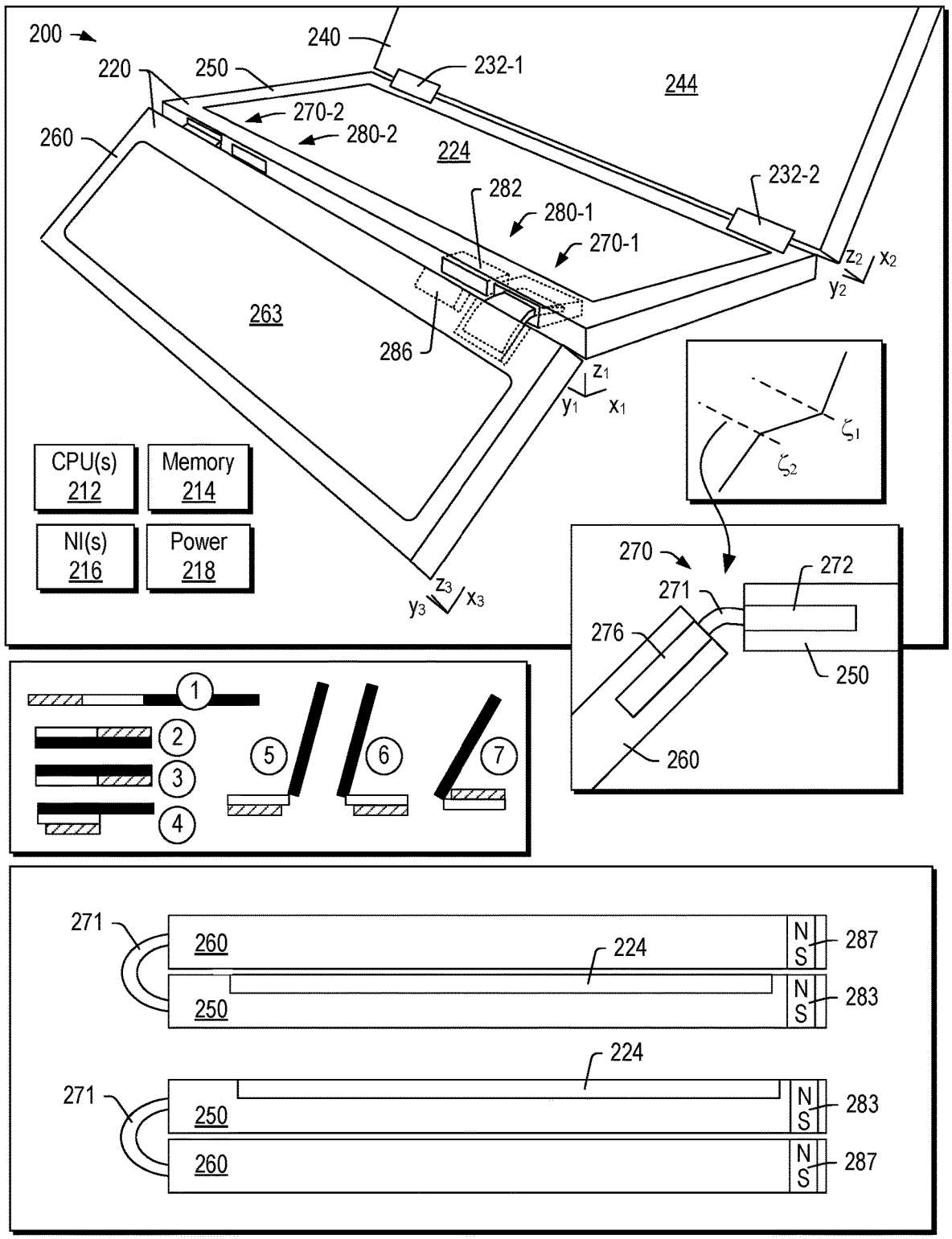
FIG. 2 is a diagram of an example of a device and examples of orientations of the device.

FIG. 2 shows an example of a device 200 that includes a processor 212 or processors, memory 214 accessible by the processor 212; a display housing 240 that includes a display 244 operatively coupled to the processor 212; a keyboard housing 250; a palm rest housing 260; a first hinge assembly 232-1 and 232-2 that operatively couples the keyboard housing 250 to the display housing 240; and a second hinge assembly 270-1 and 270-2 that operatively couples the palm rest housing 260 to the keyboard housing 250. In the example of FIG. 2, the keyboard housing 250 and the palm rest housing 260 may be components of a keyboard and palm rest assembly 220 that includes one or more hinge assemblies.

FIG. 2 shows three coordinate systems, one for the display housing 240, one for the keyboard housing 250 and one for the palm rest housing 260. One or more features of the device 200 may be described with respect to one or more of the three coordinate systems, which can be Cartesian coordinate systems. FIG. 2 also shows two axes, labeled $\zeta_1$ and $\zeta_2$, which are between the display housing 240 and the keyboard housing 250 and between the keyboard housing 250 and the palm rest housing 260, respectively. As an example, the housings 240, 250 and 260 may be rotatable by at least 180 degrees about the axes and may be rotatable by approximately 360 degrees.

As shown in the example of FIG. 2, the keyboard housing 250 includes a keyboard 224 and the palm rest housing 260 may include a surface 263 that may be a touchpad surface for a touchpad, which may be a wide touchpad or a touchpad that is less than a width of a spacebar of the keyboard 224 (e.g., consider a QWERTY keyboard).

In the example of FIG. 2, the hinge assembly 270 can include an elastomeric element 271 that is disposed at least in part in the keyboard housing 250 via a clamp 272 and disposed at least in part in the palm rest housing 260 via a clamp 276. In such an example, the clamps 272 and 276 can be sockets in the housings 250 and 260 that may, for example, be tightened via one or more mechanical components or glued via one or more adhesive materials, etc. As an example, a hinge assembly between the keyboard housing 250 and the palm rest housing 260 may be mechanical such as, for example, a tension hinge (see, e.g., the hinge assemblies 232-1 and 232-2).

FIG. 2 shows seven example orientations labeled with circles numbered 1, 2, 3, 4, 5, 6 and 7 where the display housing 240 is solid black, the keyboard housing 250 is solid white and where the palm rest housing 260 is hatched. Such orientations may depend on hinge arrangements, hinge features, elastomeric element(s), etc. As shown, orientation 1 is a flat, planar orientation; the orientation 2 is a closed clamshell orientation; the orientation 3 is a tablet orientation; the orientation 4 is a tablet orientation; the orientation 5 is a laptop orientation with the keyboard 224 of the keyboard housing 250 exposed and usable; the orientation 6 is a display orientation where the keyboard 224 is at least partially covered by the palm rest housing 260 (see also orientation 4 where transitions may be made between orientations 4 and 6); and the orientation 7 is another display orientation, which depending on the features of the device 200 may allow for further angling down of the display housing 240 to a tablet orientation (e.g., consider how one may transition from the orientation 6 to the orientation 4); noting that the orientation 7 may be achieved from the orientation 5 by rotating the palm rest housing 260 and the keyboard housing 250 stack toward the back side of the display housing 240.

As an example, the device 200 can include a clamshell orientation of the display housing 240 with respect to the keyboard housing 220 and the palm rest housing 260 (see, e.g., orientation 2 as a closed clamshell).

As an example, the palm rest housing 260 of the device 200 can include an approximately 0 degree orientation with respect to the keyboard housing 250 where the palm rest housing 260 covers at least some keys of the keyboard 224 of the keyboard housing 250 (e.g., the palm rest housing 260 folded on top of the keyboard housing 250). In such an example, the palm rest housing 260 may be sized (e.g., have a footprint) that covers all of the keys of the keyboard 224 of the keyboard housing 250.

As an example, the palm rest housing 260 of the device 200 can include an approximately 0 degree orientation with respect to the keyboard housing 250 where the palm rest housing 260 covers at least some keys of the keyboard 224 of the keyboard housing 250 (e.g., the palm rest housing 260 stacked on the keyboard housing 250) and where the approximately 0 degree orientation is a tablet orientation of the device 200 (e.g., where the stacked palm rest housing 260 and the keyboard housing 250 are rotated to the back side of the display housing 240) where the device 200 has a maximum thickness defined by the display housing 240, the keyboard housing 250, and the palm rest housing 260 (see, e.g., the thicknesses in the z-directions of the three coordinate systems of FIG. 2). In such an example, a back side of the display housing 240 can face a back side of the keyboard housing 250 (see. e.g., the orientation 4 where the back side of the palm rest housing 260 is facing downward and is an exposed side and the back side of the keyboard housing 250 is facing the back side of the display housing 240). As an example, the display housing 240, the keyboard housing 250 and the palm rest housing 260 can transition to the tablet orientation (e.g., tablet orientation 4) via a Z-shape where each of the housings 240, 250 and 260 forms a leg of the letter "Z".

As an example, the palm rest housing 260 can include an approximately 360 degree orientation with respect to the keyboard 224 of the keyboard housing 250 (e.g., folding the palm rest housing 260 underneath the keyboard housing 250). In such an example, the approximately 360 degree orientation can be a tablet orientation of the device 200 where the device 200 has a maximum thickness defined by the display housing 240 and one of the keyboard housing 250 and the palm rest housing 260. In such an example, a front side of the palm rest housing 260 can face a back side of the display housing 240. Such an example may optionally be accommodated by the hinges 232-1 and 232-2 being expandable (e.g., stretchable) as the keyboard housing 250 may be displaced a distance from the display housing 240 by a thickness of the palm rest housing 260 (e.g., where a stack is formed by the keyboard housing 240, the palm rest housing 260 and the display housing 240). As an example, where the hinges are not expandable to accommodate such an orientation, may provide for angling the display housing 240 against an edge of the palm rest housing 260 (see, e.g., the orientation 7; noting that where the hinges are expandable, the display housing 240 may be set parallel to the palm rest housing 260).

As an example, the keyboard housing 250, as operatively coupled to the palm rest housing 260, may be detachable from the display housing 240 of the device 200. For example, the hinge assemblies 232-1 and 232-2 may allow for decoupling and re-coupling of the display housing 240 and the keyboard housing 250. As an example, the display housing 240 may be decouple-able and recouple-able from the hinge assemblies 232-1 and 232-2 such as in a LENOVO® HELIX® computer (e.g., a coupled state or orientation and a decoupled state or orientation). In such an example, the display housing 240 can include one or more processors and associated memory that allow the display housing 240 to optionally operate independent of the keyboard housing 250 and/or the palm rest housing 260, one of which may include one or more processors (e.g., and associated memory, etc.).

Figure 5:
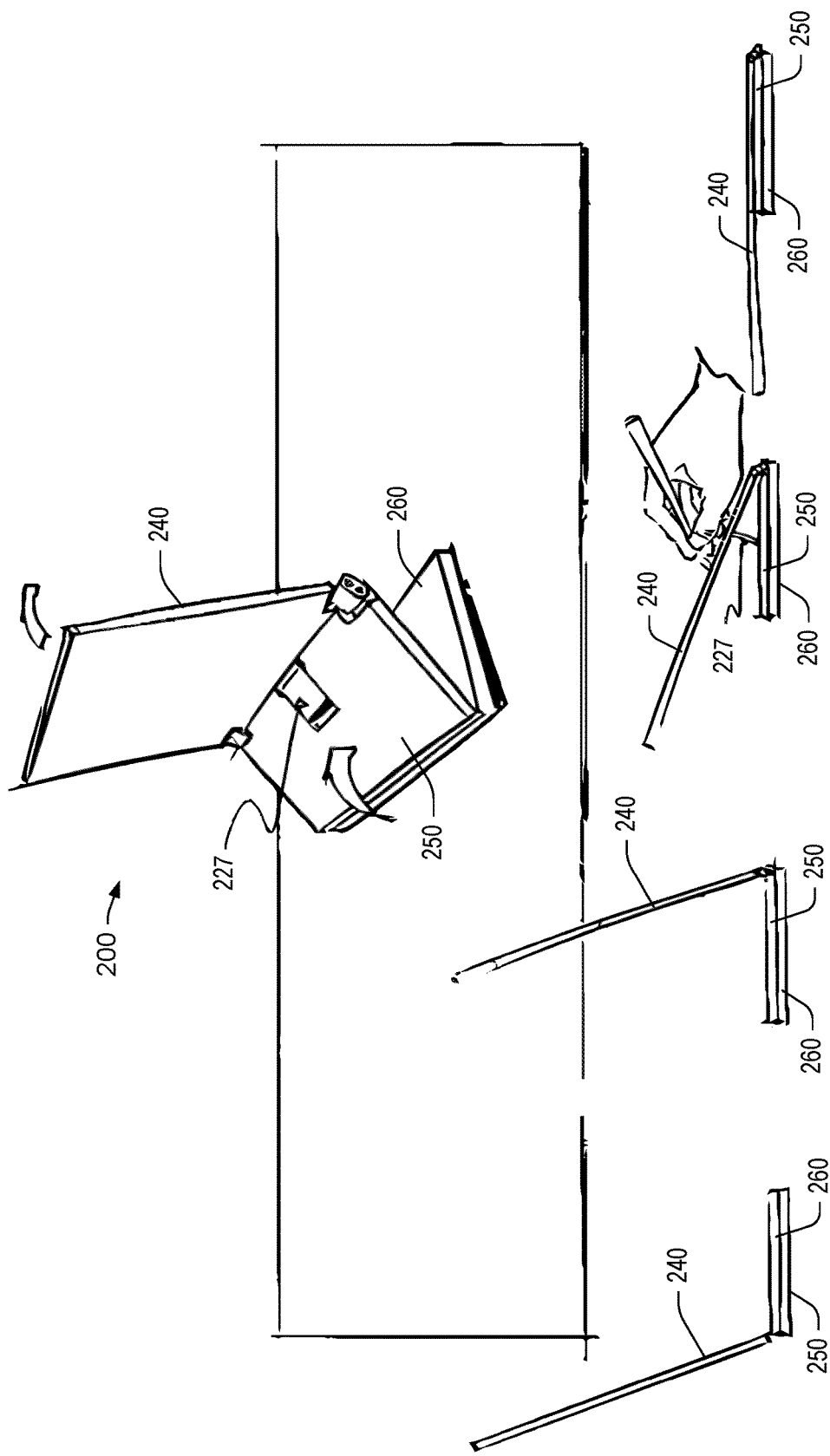
FIG. 5 is a series of diagrams of an example of the device of FIG. 2.

As an example, the keyboard housing 250 can include an adjustable display housing support that extends from a back side of the keyboard housing 250 (see, e.g., a support 227 as in the example of FIG. 5). For example, consider the orientation 6 where a support may support the display housing 240.

As an example, the device 200 can include a first laptop mode and a second laptop that are distinguished by the orientation of the palm rest housing 260 with respect to the keyboard housing 250. In such an example, in the first laptop mode, the palm rest housing 260 and the keyboard housing 250 form a planar two-piece housing (see, e.g., label 220 of FIG. 2, where the housings 250 and 260 may be oriented in a planar manner); and, in the second laptop mode, the palm rest housing 260 and the keyboard housing 250 are stacked (see, e.g., the orientation 5).

As an example, the device 200 can include a first tablet mode and a second tablet mode that are distinguished by the orientation of the palm rest housing 260 with respect to the keyboard housing 250. In such an example, in the first tablet mode, the palm rest housing 260 and the keyboard housing 250 form a planar two-piece housing (see, e.g., label 220 of FIG. 2, where the housings 250 and 260 may be oriented in a planar manner as shown in the orientation 3); and, in the second tablet mode, the palm rest housing 260 and the keyboard housing 250 are stacked (see, e.g., the orientation 4 or, for example, the orientation 7 as transitioned to a tablet mode where a hinge or hinges are expandable).

As an example, a hinge assembly that operatively couples a display housing to a keyboard housing can include at least one friction hinge and, for example, another hinge assembly can include one or more elastomeric elements (e.g., one elastomeric element or a plurality of elastomeric elements). As an example, a hinge assembly may include a combination of one or more elastomeric elements and one or more mechanical elements.

As an example, a hinge assembly can include at least one magnet. As an example, a housing can include one or more magnets and/or one or more ferromagnetic components.

As shown in FIG. 2, the keyboard housing 250 and the palm rest housing 260 can include magnetic components 280-1 and 280-2 and/or 283 and 287. The magnetic components 280-1 and 280-2 can provide one or more magnetic coupling orientations. For example, where the housings 250 and 260 are planar (e.g., in the same plane), the magnetic components 280-1 and 280-2 may provide magnetic coupling force that draws an edge of the palm rest housing 260 to an edge of the keyboard housing 250 (see, e.g., edges in y,z-planes to couple the housings 250 and 260 in alignment of their x,y-planes being in a common plane).

As various types of devices become thinner, a side, as in a side of a box, may be referred to as an edge. As an example, an edge may be a relatively thin side of a housing. As an example, a housing may be of a thickness of about 2 cm or less where a side that is not a display side or opposing a display side, that is not a keyboard side or opposing a keyboard side, that is not a palm rest side or opposing a palm rest side may be referred to as an edge. As an example, an edge may be of the order of approximately 0.3 cm to approximately 2 cm (e.g., a housing may be of a thickness from approximately 0.3 cm to approximately 2 cm). As an example, the device 200 of FIG. 2 may be approximately 3 cm or less in maximum thickness when in the orientation 4 (e.g., for three housings that can be stacked, an average housing thickness is approximately 1 cm or less, but, for example, with each individual housing having a thickness greater than approximately 0.3 cm). As mentioned, in the orientation 4, the stack formed by the keyboard housing 250 and the palm rest housing 260 can form a step or a shoulder that can be utilized as a finger grip (e.g., for one or more fingers of a hand).

As to the magnetic components 283 and 287, they can allow for magnetic coupling orientations shown in side views of FIG. 2. For example, the component 283 may be a magnet with north and south poles and the component 287 may be a magnet with north and south poles. As shown, the south pole of the magnet 287 can be attracted to the north pole of the magnet 283 (keyboard 224 covered by the palm rest housing 260 orientation) and the south pole of the magnet 283 can be attracted to the north pole of the magnet 287 (keyboard 224 exposed with the palm rest housing 260 beneath the keyboard housing 250 orientation). The magnetic components 283 and 287 may allow for application of a magnetic force that helps to retain the device 200 in one or more of the orientations 4, 5, 6 and 7. As an example, the display housing 240 may include one or more magnetic components that are positioned to interact with one or more of the magnetic components 283 and 287, which may, for example, help to retain the device 200 in one or more orientations such as one or more of the orientations 1, 2, 3 and 4.

Figure 3:
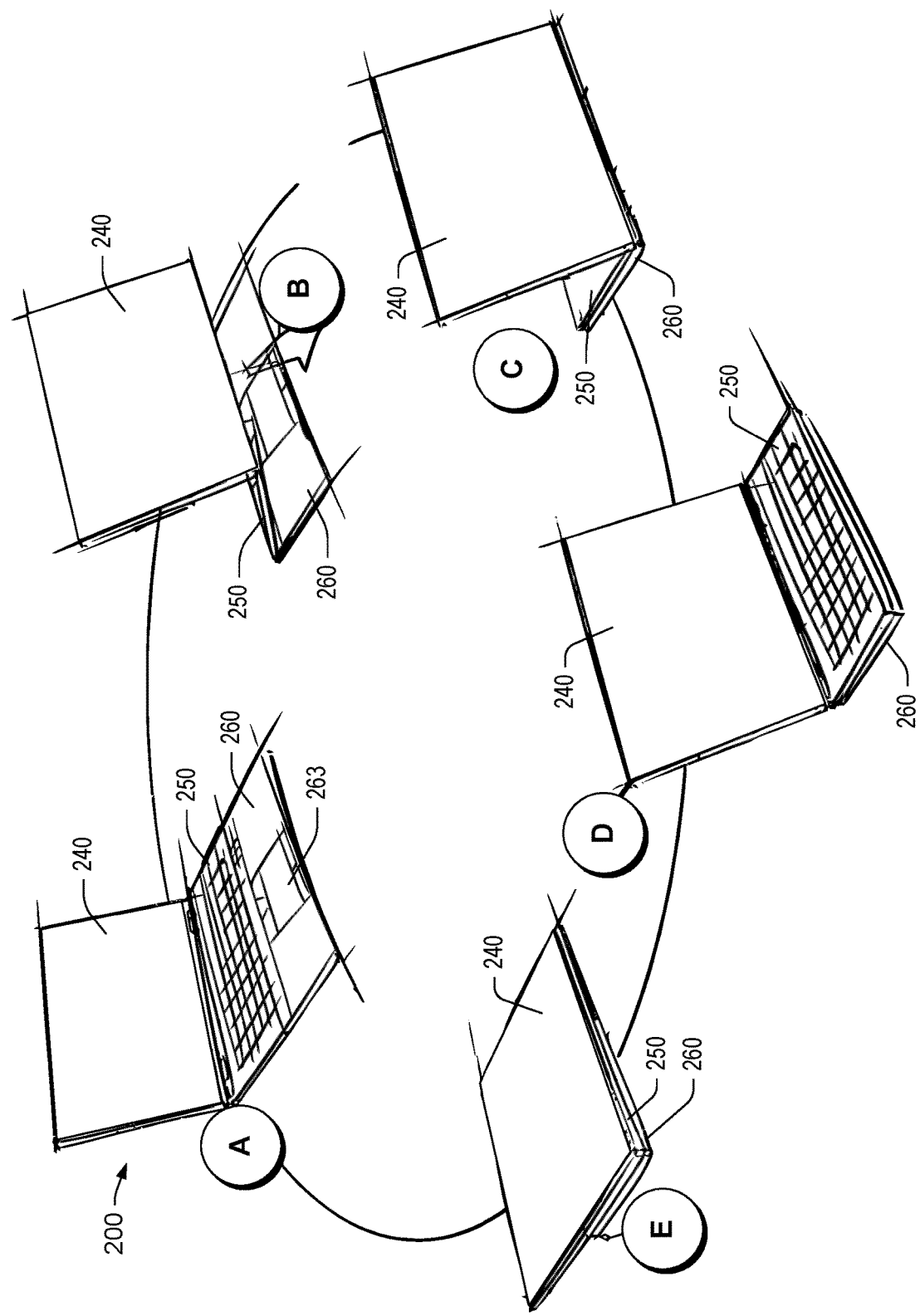
FIG. 3 is a series of diagrams of the device of FIG. 2 in different orientations.
Figure 4:
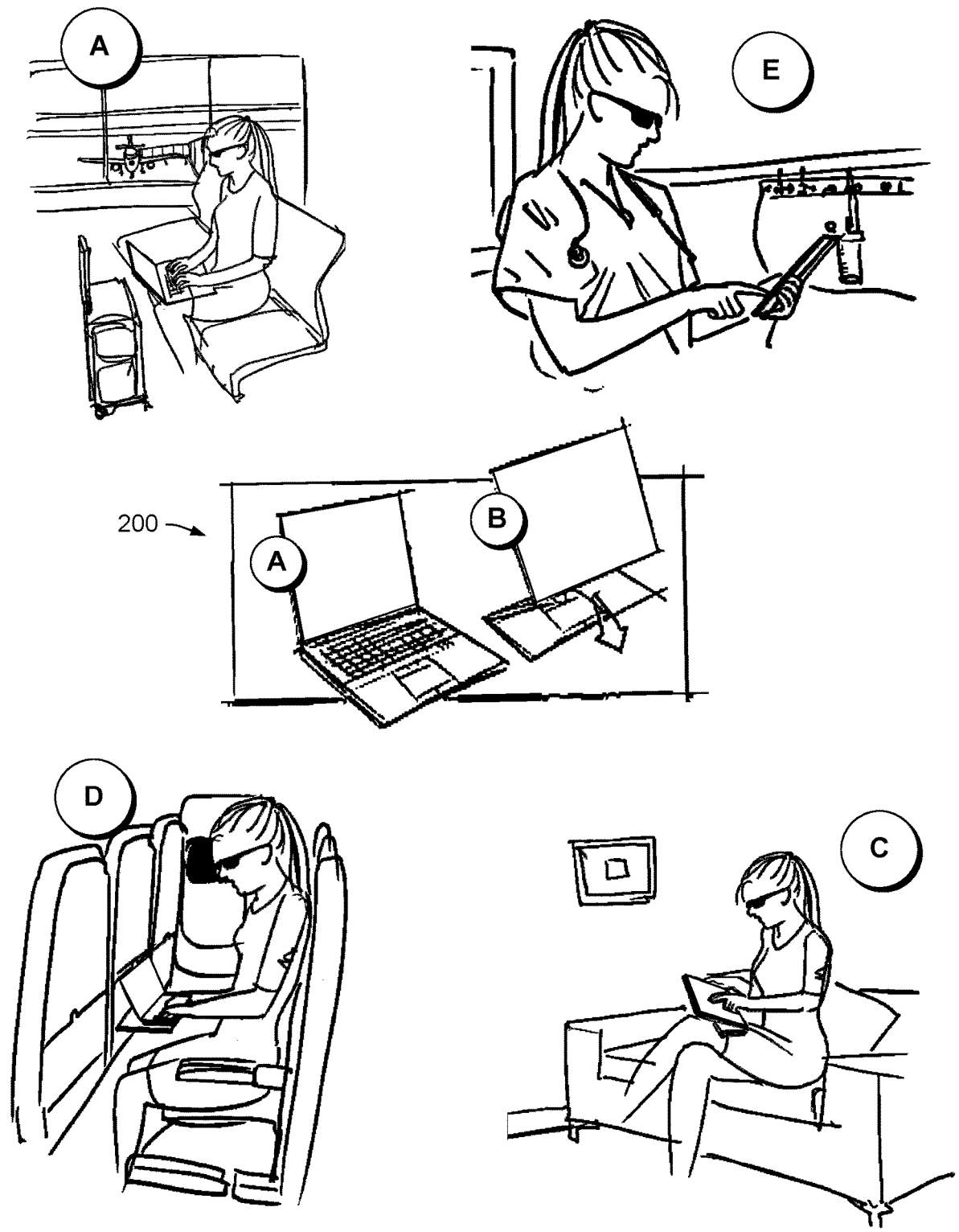
FIG. 4 is a series of diagrams of the device of FIG. 2 in various orientations.

As an example, the device 200 can include circuitry that makes the device 200 orientation aware. For example, the device 200 can include one or more accelerometers, one or more gyroscopes, one or more proximity sensors, one or more magnetic field sensors (e.g., to sense presence and/or position of a magnet), one or more hinge assembly orientation sensors, etc. As an example, an operational state of a component of the keyboard housing may depend on orientation of the keyboard housing with respect to the palm rest housing and/or an operational state of a component of palm rest housing may depend on orientation of the palm rest housing with respect to the keyboard housing. As an example, where the palm rest housing includes a touchpad, the touchpad may be transitioned from one operational state to another based on orientation. For example, where a touchpad is oriented downwardly toward a surface (e.g., a table, a desk, a user's leg or legs, a chair, etc.), the touchpad may be disabled and/or implement rejection circuitry that rejects input. In FIG. 2, consider the lower orientation of the two side views, which are shown, for convenience, without the display housing 240; noting that FIGS. 3, 4 and 5 show various views with the display housing 240.

As an example, the device 200 of FIG. 2 can include the display housing 240 with a width, a depth and a thickness; the keyboard housing 250 with a width, a depth and a thickness; the palm rest housing 260 with a width, a depth and a thickness; where the sum of the depth of the keyboard housing 250 and the depth of the palm rest housing 260 is approximately the depth of the display housing 240. In such an example, the widths can be defined with respect to a y-direction and the depths can be defined with respect to an x-direction and the thicknesses can be defined with respect to a z-direction. FIG. 2 shows various Cartesian coordinate systems, which may be utilized to describe one or more features of a device, a housing, a coupling mechanism, etc.

As an example, the device 200, in a tablet mode, can have a hinge assembly end of the keyboard housing 250 and a hinge assembly end of the palm rest housing 260 form a finger grip (see, e.g., the orientation 4 of FIG. 2). In such an example, the finger grip can be adjacent a back side of the display housing 240. In such an example, the hinge assembly can include one or more elastomeric elements.

As an example, the palm rest housing 260 can include circuitry and an electrical interface and the keyboard housing 250 can include an electrical interface that electrically couples to the electrical interface of the palm rest housing 260. In such an example, in a planar orientation of the palm rest housing 260 to the keyboard housing 250, the electrical interfaces can be in an electrically coupled state (see, e.g., the orientation 1 of FIG. 2; noting that the display housing 240 may be set at an angle to the other housings for viewing as in a laptop mode). As an example, the palm rest housing 260 may include one or more batteries such as, for example, one or more lithium ion batteries that can be rechargeable via circuitry that may be within the palm rest housing 260 and/or within one or more of the other housings 240 and 250. As an example, the palm rest housing 260 can include a connector for a power cable, which may be connectable to a power supply (e.g., an adapter, an outlet, etc.).

As an example, the palm rest housing 260 can have a thickness, the keyboard housing 250 can have a thickness, and the thicknesses may be approximately equal.

FIG. 3 shows the device 200 in various example orientations A, B, C, D, and E. The orientation A may be a standard laptop orientation of the housings 240, 250 and 260; the orientation B may be a transitional orientation where the housings 240, 250 and 260 form a Z-shape; the orientation C may be a folded orientation where the display of the display housing 240 is viewable and supportable by the housings 250 and 260, for example, in a touchscreen mode (e.g., where the display is a touchscreen display); the orientation D may be a folded orientation where the footprint of the device 200 is reduced to approximately the footprint of the keyboard housing 250 where the palm rest housing 260 is folded beneath the keyboard housing 250; and the orientation E may be a folded orientation where an edge (e.g., a step or a shoulder) is formed by the housings 250 and 260 with respect to the housing 240, which may provide a gripping surface for one or more fingers of a hand or hands.

FIG. 4 shows the device 200 in various example orientations labeled A, B, C, D and E, which correspond to the example orientations A, B, C, D and E of FIG. 3. As shown, the orientation A may be a laptop orientation where the housings 250 and 260 are in a planar arrangement; the orientation B may be a transitional orientation where the housings 240, 250 and 260 form a Z-shape; the orientation C may be a touchscreen mode orientation where the housings 250 and 260 may be stacked and utilized as a lap support for the housing 240; the orientation D may be a reduced footprint orientation where the palm rest housing 260 is folded underneath the keyboard housing 250, for example, to use in narrow aisle seating as in an airplane with a fold-down table (e.g., a food tray or drink table); and the orientation E may be a tablet with grip orientation where a user may hold the device 200 with one hand while using a finger or fingers of the other hand to enter touch input (e.g., optionally including gesture input, which may be multitouch) via a touchscreen display of the display housing 240).

FIG. 5 shows the device 200 in various example orientations as well as including a display stand 227, which may be operatively coupled to the keyboard housing 250 or, alternatively or additionally, to the display housing 240 or, alternatively or additionally, to the palm rest housing 260. As shown, the display stand 227 can be rotatable from a recess of a housing to support the display housing 240. In such an example, the display stand 227 can provide support sufficient for the weight/force applied by a hand where a user may utilize a stylus to contact a display side of the display housing 240. In such an example, the user may rest her palm against the display side of the display housing 240 where the weight/force applied by the palm is transferred to the display stand 227, which can be transferred to a table or desk via the housings 250 and/or 260. As an example, a device can include a gusset that can be positioned to provide support to a display housing and/or another housing. As an example, a support can be a foldable support that may be relatively flat in a storage orientation and tented in a support orientation. For example, consider a stiff fabric or other type of material that can be flat for storage (e.g., in a recess of a housing) and tented to extend from a housing to support another housing. As an example, a piece of stiff fabric may be pinched with fingers of a hand to cause it to stand-up in a tented manner where it can support a display housing.

Figure 6:
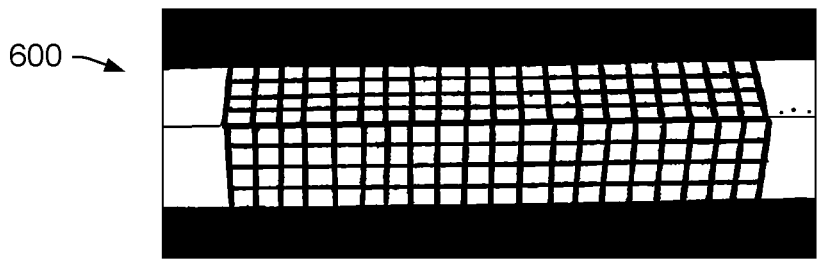
FIG. 6 is a series of diagrams of an example of an elastomeric element and examples of elastomeric elements.
Figure 6:
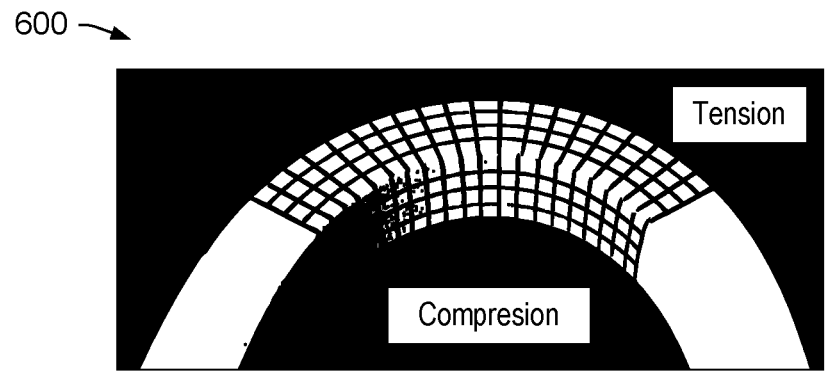
Figure 6:
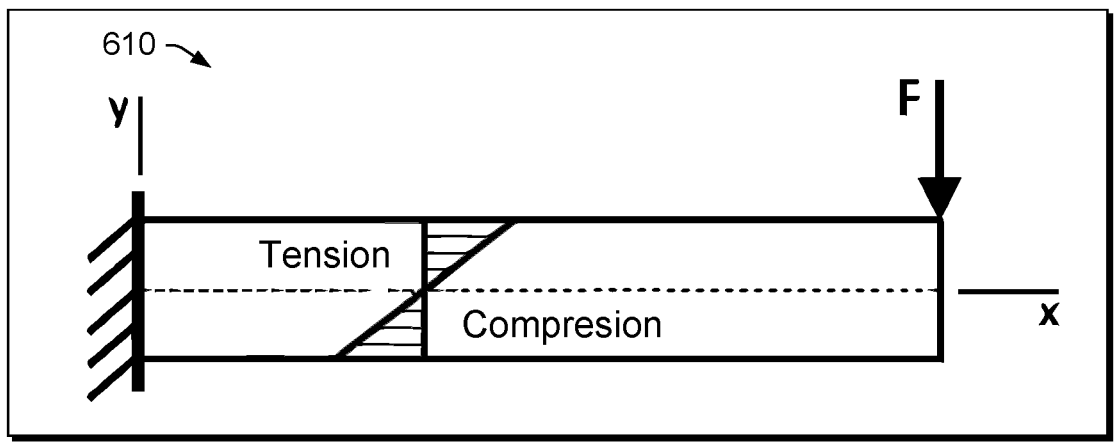
Figure 6:
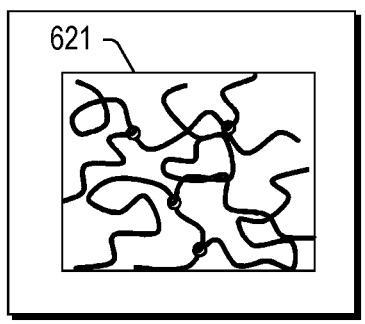
Figure 6:
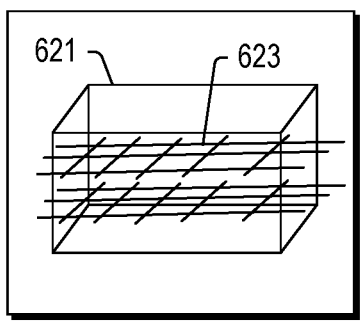
Figure 6:
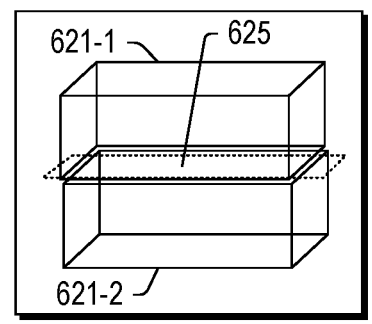

FIG. 6 shows an example of an elastomeric element 600 in two different states such as a relaxed state (e.g., a free state) and a bent state where the elastomeric element 600 experiences tension and compression. As shown, compression can be experienced about a smaller radius side of the bend of the elastomeric element 600 while tension can be experienced about a larger radius side of the bend of the elastomeric element 600. In such an example, the elastomeric element 600 can store potential energy with respect to tension and can store potential energy with respect to compression.

FIG. 6 also shows a diagram 610 of a beam where a force is applied to the beam at a distance in the x-direction from a fixed point of the beam. As shown, the upper half of the beam experiences tension and the lower half of the beam experiences compression.

As an example, one or more elastomeric elements may be included in a device as part of a hinge assembly. An elastomeric element may provide elastic potential energy for assistance in orienting a device in one or more orientations. Elastic potential energy can be energy stored as a result of applying a force to deform an elastic object (e.g., an elastomeric element). The elastic potential energy can be stored (e.g., where material degradation does not occur, etc.) until the force is removed and the object springs back to its original shape, doing work in the process. As an example, deformation of an elastomeric element from a free standing state can involve one or more compressing, stretching or twisting the elastomeric element.

As an example, an elastomeric element may be a rubber, which may be synthetic, natural or synthetic and natural. As an example, an elastomeric element may be a polydimethylsiloxane (PDMS) element. PDMS belongs to a group of polymeric organosilicon compounds that are sometimes referred to as silicones. PDMS is a silicon-based organic polymer. PDMS is optically clear, and, in general, inert, non-toxic, and non-flammable. The chemical formula for PDMS is $CH_3[Si(CH_3)_2O]_nSi(CH_3)_3$, where n is the number of repeating monomer $[SiO(CH_3)_2]$ units. PDMS can be characterized as being a two part polymer in which a monomer is mixed with a curing agent, degassed and cured. The composition of PDMS may be characterized by the ratio of monomer to curing agent.

PDMS can be viscoelastic, depending on its formulation and/or embedded material, if present. A viscoelastic material may, at long flow times (or high temperatures), act like a viscous liquid, similar to honey; however, at short flow times (or low temperatures), it can act like an elastic solid, similar to rubber. In other words, if some types of PDMS are left on a surface overnight (long flow time), they may flow to cover the surface and mold to any surface imperfections; however, if the same PDMS is rolled into a sphere and thrown onto the same surface (short flow time), it may bounce like a rubber ball. The shear modulus of PDMS varies with preparation conditions and may be in a range of approximately 100 kPa to approximately 3 MPa. The loss tangent of PDMS tends to be relatively low (tan $\delta \ll 0.001$).

As an example, an elastomeric element may be formed using a material such as PDMS optionally in combination with one or more other materials to achieve properties suitable for use of the elastomeric element in a device as part of a hinge assembly.

As an example, an elastomeric element may be reinforced via one or more materials. For example, an elastomeric element may be reinforced with one or more types of fibers, which may include a fiber mesh or fiber meshes. As an example, an elastomeric element may include embedded material, which may be, for example, reinforcing material and/or transmission material such as, for example, an electrical wire or wires, an optical fiber or fibers, a waveguide or waveguides, etc.

As an example, mechanical properties of an elastomer of an elastomeric element may be tailored via multi-modal network(s) formation. For example, a PDMS may be formed with a bimodal network with short and long polymer chains (e.g., of the same or similar chemical composition) cross-linked into the bimodal network. A multi-modal elastomer can be tailored to have mechanical properties that are superior to a single modal elastomer. For example, a bimodal network PDMS can exhibit high tear resistance and ultimate strength. As an example, elastic modulus of a bimodal network can increase at high elongations, such that the ultimate strength of the bimodal network is high. Improvements in ultimate strength can stem from limited extensibility of short chains, which gives the multi-modal network toughness. Furthermore, relatively long chains can retard the rupture process and provide extensibility to the bimodal network. As an example, a multi-modal network can exhibit a substantial ultimate stress and ultimate strain. A multi-modal network can be created by distribution of short polymer chains within long chains or, for example, as heavily cross-linked short-chain domains joined to a long-chain network.

FIG. 6 shows an example of an elastomeric element 621, which may be a polymer and cross-linker network suitable for use as the elastomeric element 271 as shown in the example of FIG. 2. FIG. 6 also shows an example of the elastomeric element 621 as including fibers 623, which may be one or more fiber meshes. FIG. 6 further shows an example of two elastomeric elements 621-1 and 621-2 with a material 625 disposed therebetween. In such an example, the material 625 can be or include one or more wires (e.g., electrically conductive paths), one or more optical fibers and/or one or more waveguides.

As an example, circuitry of a keyboard housing may be operatively coupled to circuitry of a palm rest housing via one or more materials disposed in and/or disposed on an elastomeric element or, for example, between two elastomeric elements.

Figure 7:
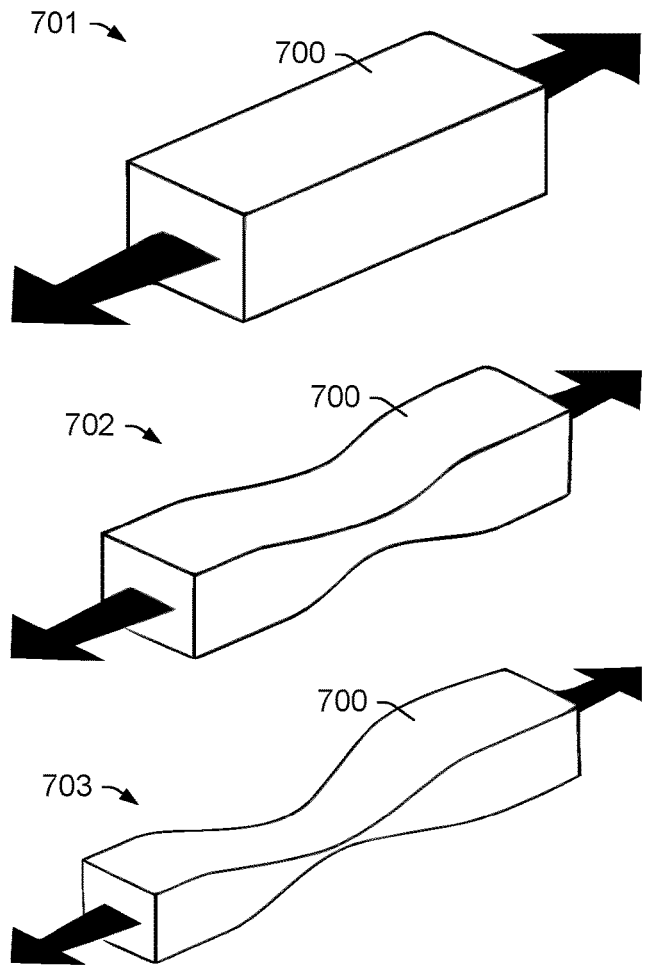
FIG. 7 is a series of diagrams of an example of an elastomeric element and examples of devices that include one or more elastomeric elements.
Figure 7:
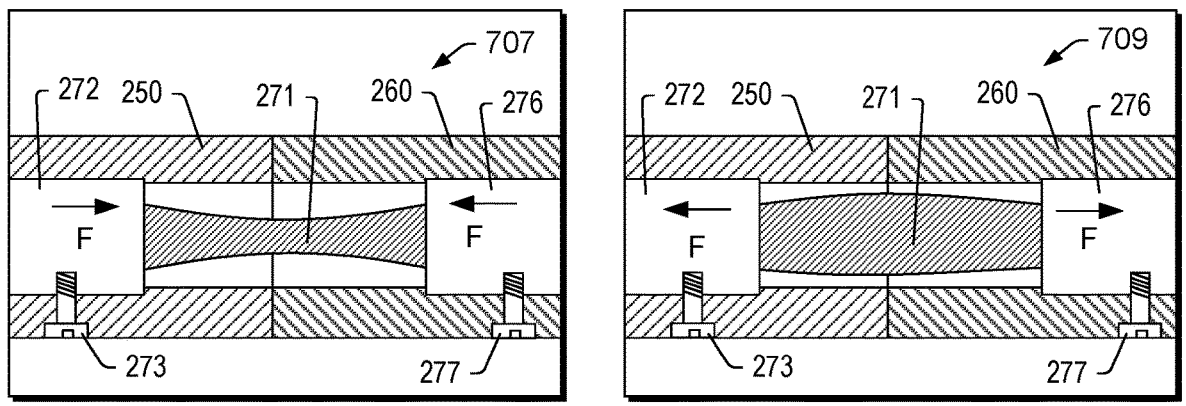

FIG. 7 shows an elastomeric element 700 in three states 701, 702 and 703 where the first state 701 may be a free standing state, the second state 702 may be an axial tension state and the third state 703 may be an increased axial tension state. As an example, another state can be a compression state where the elastomeric element 700 may be bulging in its cross-sectional area. For example, the free standing state may have a free standing cross-sectional area profile, which may be constant along the longitudinal axis or varying due to how the elastomeric element was shaped as formed; whereas, in a tension state, necking may occur as exhibited by a decreased cross-sectional area and, in a compression state, bulging may occur as exhibited by an increased cross-sectional area. In the tension state, the elastomeric element 700 may apply a force that acts to bring its ends axially toward each other; whereas, in the compression state, the elastomeric element 700 may apply a force that acts to push its ends axially away from each other.

In the example of FIG. 7, the elastomeric element 700 may be suitable for use as the elastomeric element 271 of the example of FIG. 2. As an example, the elastomeric element 700 may be configured as one or more of the examples of FIG. 6 (see, e.g., the elastomeric elements 621, 621-1, and 621-2, optionally including embedded, reinforcing or other material.

As an example, a material that is disposed in and/or disposed on one or more elastomeric elements may be elastomeric. For example, a wire may be a coiled wire such that the wire can extend in an axial direction when an elastomeric element or elements are extended in an axial direction and contract in the axial direction when the elastomeric element or elastomeric elements contract.

As an example, an elastomeric element may be fit to a first housing and fit to a second housing where, in a planar orientation of the first and second housings, the elastomeric element is in a free standing state, in a tension state or in a compression state. For example, in a free standing state, folding of the first and second housings can cause the elastomeric element to experience compression and tension due to bending; in a tension state, folding of the first and second housings can cause the elastomeric element to experience compression and tension due to bending and further tension where elongation occurs with respect to its axial length; and, in a compression state, folding of the first and second housings can cause the elastomeric element to experience compression and tension due to bending and release of compression axially, which may facilitate movement of an edge of the first housing away from an edge of the second housing.

In the various example states (free standing, tension and compression), magnetic components may optionally be utilized. For example, magnetic components may help to retain the first housing and the second housing in the planar orientation where tension is insufficient or to cause compression. As an example, magnetic force may be sufficient to cause an elastomeric element to compress and store potential energy such that when the magnetic force is "broken", the elastomeric element expands to release the potential energy (e.g., a spring apart action). In such an example, upon realignment of edges of the first and second housings in the planar orientation, snapping back may occur due to magnetic attraction between the edges, which may compress the elastomeric element to "charge" it with potential energy. In contrast, where the planar orientation has one or more elastomeric elements in a tension state, transitioning back to the planar orientation may be facilitated by a tendency for one or more elastomeric elements to contract, which may be limited as to contracting to achieve the free standing state due to contact between edges of the two housings, etc.

FIG. 7 shows a tension state arrangement 707 and a compression state arrangement 709 for the keyboard housing 250 and the palm rest housing 260 with respect to the elastomeric element 271 as secured by the clamp 272 and the clamp 276. As an example, the clamp 272 may be secured in the housing 250 via a bolt 273 (e.g., a screw, a pin, etc.) and the clamp 276 may be secured in the housing 260 via a bolt 277 (e.g., a screw, a pin, etc.). As an example, the clamps 272 and 276 may be unitary pieces or multi-piece clamps that can secure an elastomeric element. For example, the clamps 272 and 276 may include one or more clips, one or more bolts, one or more screws, etc. As an example, the bolt 273 may pass through the elastomeric element 271 and thereby secure the elastomeric element 271 with respect to the housing 250. As an example, the bolt 277 may pass through the elastomeric element 271 and thereby secure the elastomeric element 271 with respect to the housing 260.

As shown, in the tension state arrangement 707, the housings 250 and 260 may be pulled toward each other; whereas, in the compression state arrangement 709, the housings 250 and 260 may be pushed away from each other while being held together via another mechanism or mechanisms such as, for example, a magnetic mechanism and/or a mechanical mechanism. Such a mechanism or mechanisms may be releasable and latchable where release causes the stored potential energy of the elastomeric element to be converted to kinetic energy that pushes the housings away and where latching can cause compression of the elastomeric element to store potential energy.

Figure 8:
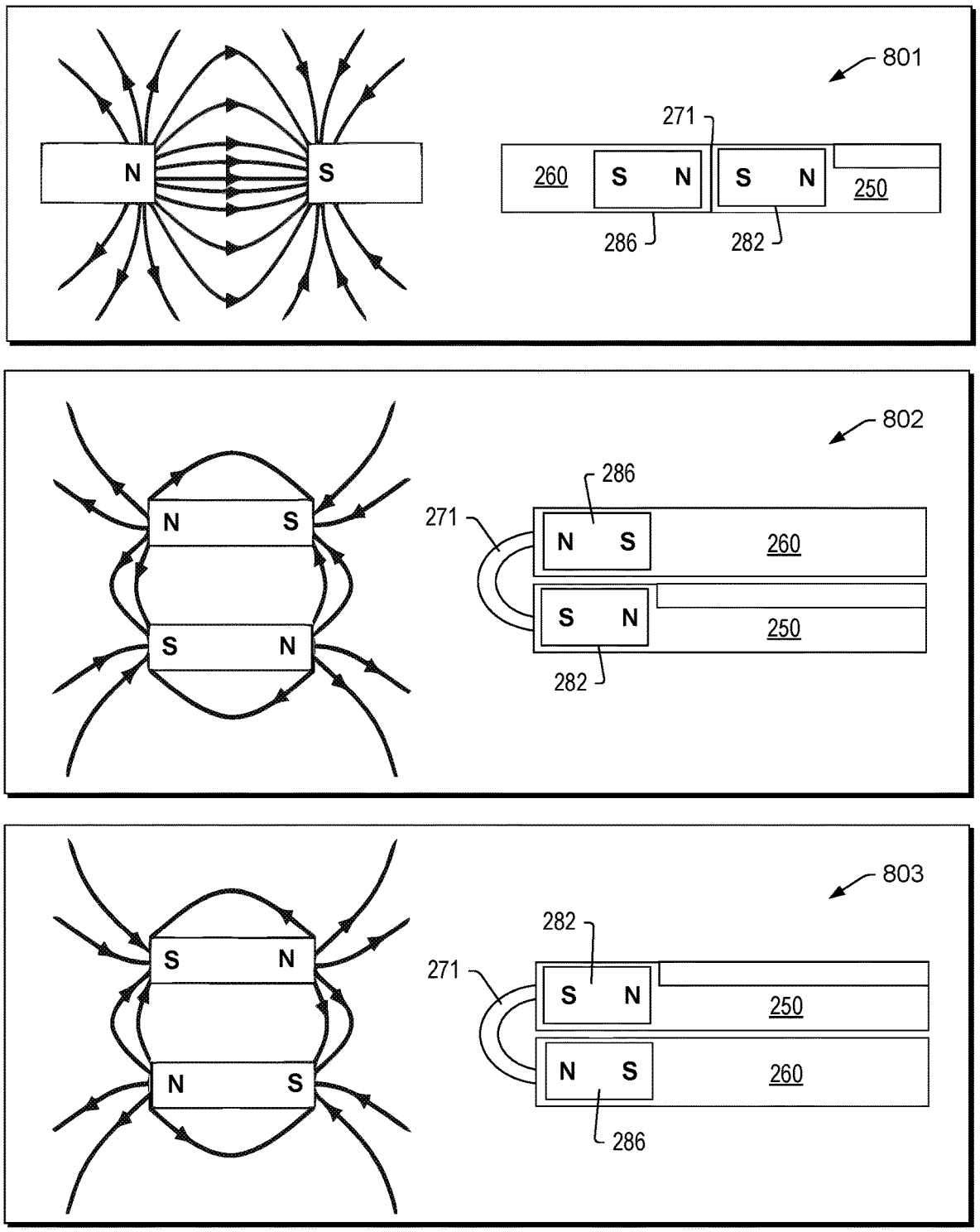
FIG. 8 is a series of diagrams of examples of magnets of housings of a device in various orientations.

FIG. 8 shows examples of orientations 801, 802 and 803 as to the magnetic components 282 and 286 set in the housings 250 and 260. In the examples of FIG. 8, the magnetic components 282 and 286 may be reversed as to their north and south poles.

In the orientation 801, the housings 260 and 250 are in a planar orientation where a north pole and a south pole align and attract for the magnetic components 282 and 286.

In the orientation 802, the housings 260 and 250 are in a stacked orientation with the keyboard of the keyboard housing 250 covered by the palm rest housing 260 where north poles and south poles align and attract for the magnetic components 282 and 286.

In the orientation 803, the housings 260 and 250 are in a stacked orientation with the keyboard of the keyboard housing 250 exposed where north poles and south poles align and attract for the magnetic components 282 and 286.

In one or more of the example orientations 801, 802 and 803, the magnetic attraction can help to maintain a state of the elastomeric element 271, which may be more than one elastomeric element (see, e.g., 271-1 and 271-2 of FIGS. 2 and 621-1 and 621-2 of FIG. 6).

As shown in the examples of FIG. 8, a combination of an elastomeric element and magnetic components can be utilized to form a hinge assembly that can be maintained in one or more states and that can be transitionable between states responsive to force applied by a user to manipulate a multi-housing device. In the examples of FIG. 8, the orientation 801 may be a native state where upon release of magnetic attraction, the housings 250 and 260 tend to return to the native state due at least in part to relief of bending tension and bending compression of the elastomeric element 271. As mentioned, the elastomeric element 271 may further be in one of three states along a longitudinal axis, which may be free standing, tension or compression.

As mentioned with respect to the example of FIG. 2, one or more additional magnetic components 283 and 287 may be included in a housing or housings, which may be located at one or more other locations such as one or more of the locations shown in FIG. 2.

As an example, an apparatus can include a processor; memory accessible by the processor; a first housing where the processor and the memory are disposed in the first housing; a second housing; a hinge assembly that operatively couples the first housing to the second housing where the hinge assembly includes an elastomeric element that includes a native state and a bent tension and compression state; and a latch mechanism that latches a side of the first housing to a side of the second housing in the bent tension and compression state of the elastomeric element. In such an example, the latch mechanism can latch an end of the first housing to an end of the second housing in the native state of the elastomeric element. As an example, an elastomeric element can be or include a polymeric elastomer.

As an example, an elastomeric element can include opposing ends where one end is secured to a first housing and where the other end is secured to a second housing. In such an example, the ends may be secured via clamps. As an example, an end may be secured via a hole and a member that extends into the hole. For example, consider a hole punched in an elastomeric element where a bolt can pass through the hole to secure the elastomeric element in a housing.

As an example, a latch mechanism can include at least one magnet. As an example, a latch mechanism can include at least one ferromagnetic component. As an example, a latch mechanism can include a component attached to a first housing and another component attached to a second component.

As an example, a latch mechanism can include a magnet attached to a first housing and a magnet attached to a second housing. In such an example, the magnets can include a planar latched state that corresponds to a planar orientation of the first housing and the second housing. In such an example, in the planar latched state, an end of the first housing is adjacent to an end of the second housing.

As an example, magnets can include a stacked latched state that corresponds to a stacked orientation of a first housing and a second housing. In such an example, in the stacked latched state, a side of the first housing is adjacent to a side of the second housing and, for example, the side of the first housing can be a back side and the side of the second housing can be a back side.

As an example, a latch mechanism can provide a latching force that exceeds a potential energy of a bent tension and compression state of an elastomeric element.

As an example, a device can include a plurality of elastomeric elements. As an example, a latch mechanism can store potential energy in a bent tension and compression state of one or more elastomeric elements. In such an example, release of the potential energy can transition a first housing and a second housing from a first orientation to a second orientation.

As an example, a method can include, for a first orientation of an apparatus that includes a processor, memory accessible by the processor, a first housing where the processor and the memory are disposed in the first housing, a second housing, a hinge assembly that operatively couples the first housing to the second housing where the hinge assembly includes an elastomeric element that includes a native state and a bent tension and compression state, and, a latch mechanism that latches a side of the first housing to a side of the second housing in the bent tension and compression state of the elastomeric element, releasing the latch mechanism; and, responsive to the releasing, transitioning the apparatus to a second orientation by automatically transitioning the elastomeric element from the bent tension and compression state to the native state. In such an example, the first orientation can include storing potential energy in the elastomeric element in the bent tension and compression state. As an example, in such a method, transitioning can include converting at least a portion of potential energy of the elastomeric element to kinetic energy.

As an example, a first housing can be a display housing and/or a second housing can be a keyboard housing. Such housings can include one or more electronic components, which may be operatively coupled to at least one processor, which may be via wire, wires and/or wireless circuitry.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 9:
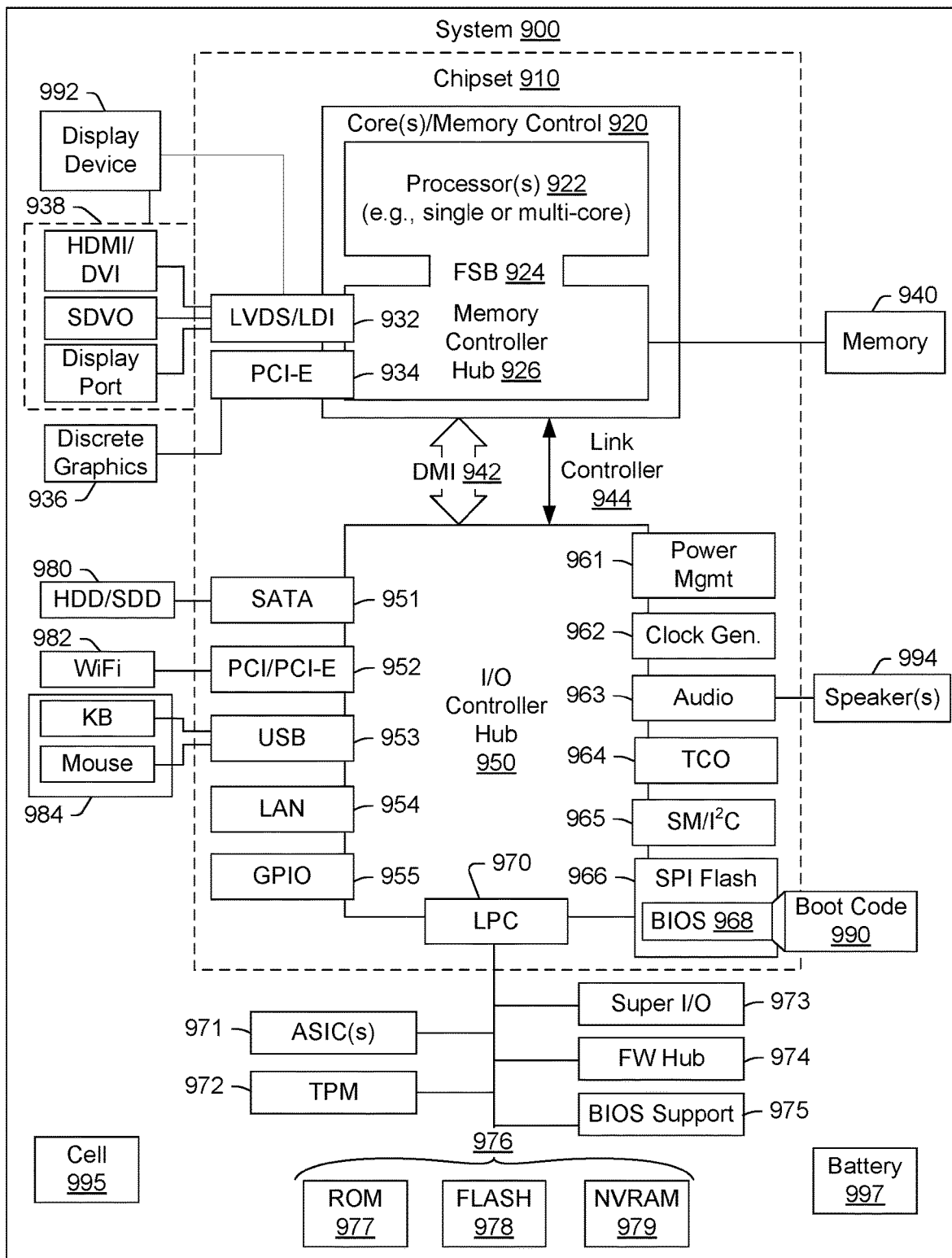
FIG. 9 is a diagram of an example of a system that includes one or more processors.

While various examples of circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., $I^2C$, etc.). As to microphones, the system 900 of FIG. 9 may include hardware (e.g., audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally include cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As an example, a SMBus may be operable via a LPC (see, e.g., the LPC interface 970), via an $I^2C$ interface (see, e.g., the SM/$I^2C$ interface 965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a processor;
memory accessible by the processor;
a display housing that comprises a display on a display housing display side, the display operatively coupled to the processor, and comprises a display housing back side;
a keyboard housing that comprises a keyboard on a keyboard housing keyboard side, a recess on a keyboard housing back side, and an adjustable display housing support that is adjustable to extend outwardly from the recess on the keyboard housing back side;
a palm rest housing wherein the palm rest housing comprises a touchpad on a palm rest housing touchpad side and comprises a palm rest housing back side;
a first hinge assembly that operatively couples the keyboard housing to the display housing; and
a second hinge assembly that operatively couples the palm rest housing to the keyboard housing,
wherein the palm rest housing comprises an approximately 0 degree orientation with respect to the keyboard housing wherein the palm rest housing covers and protects keys of the keyboard of the keyboard housing, wherein the touchpad faces the keys, and wherein, in the approximately 0 degree orientation, the keyboard housing and the palm rest housing comprise a folded orientation wherein the keyboard housing back side contacts the display housing back side to form a finger grip adjacent to the display housing back side and comprise a supported orientation of the display housing by the adjustable display housing support as extended from the recess on the keyboard housing back side to contact the display housing back side wherein force applied to the display housing display side is transferred via the adjustable display housing support to the keyboard housing and, via the keyboard housing, to the palm rest housing, wherein the palm rest housing back side defines a footprint, and
wherein the palm rest housing comprises an approximately 360 degree orientation with respect to the keyboard of the keyboard housing, wherein the touchpad faces away from the keys, wherein the keys are accessible for typing, and wherein the palm rest housing touchpad side defines a footprint.

2. The apparatus of claim 1 wherein the display housing and the keyboard housing and the palm rest housing comprise a clamshell orientation.

3. The apparatus of claim 1 wherein the palm rest housing covers all of the keys of the keyboard of the keyboard housing.

4. The apparatus of claim 1 comprising a first laptop mode and a second laptop mode that are distinguished by the orientation of the palm rest housing with respect to the keyboard housing.

5. The apparatus of claim 1 comprising a first tablet mode and wherein the folded orientation is a second tablet mode, wherein the first and second tablet modes are distinguished by the orientation of the palm rest housing with respect to the keyboard housing.

6. The apparatus of claim 5 wherein, in the first tablet mode, the palm rest housing and the keyboard housing form a planar two-piece housing.

7. The apparatus of claim 5 wherein, in the second tablet mode, the palm rest housing and the keyboard housing are stacked.

8. The apparatus of claim 1 wherein the first hinge assembly comprises at least one friction hinge.

9. The apparatus of claim 1 wherein the second hinge assembly comprises an elastomeric element.

10. The apparatus of claim 1 wherein the second hinge assembly comprises a plurality of elastomeric elements.

11. The apparatus of claim 1 wherein the second hinge assembly comprises at least one magnet.

12. The apparatus of claim 1 wherein the display housing comprises a width, a depth and a thickness, wherein the keyboard housing comprises a width, a depth and a thickness, wherein the palm rest housing comprises a width, a depth and a thickness wherein the sum of the depth of the keyboard housing and the depth of the palm rest housing is approximately the depth of the display housing.

13. The apparatus of claim 12 wherein the widths are defined with respect to a y-direction and wherein the depths are defined with respect to a x-direction and wherein the thicknesses are defined with respect to a z-direction.

14. The apparatus of claim 1 wherein, in the folded orientation, a hinge assembly end of the keyboard housing and a hinge assembly end of the palm rest housing form the finger grip.

15. The apparatus of claim 1 wherein the palm rest housing comprises circuitry and an electrical interface, wherein the keyboard housing comprises an electrical interface that electrically couples to the electrical interface of the palm rest housing, and wherein, in a planar orientation of the palm rest housing to the keyboard housing, the electrical interfaces are in an electrically coupled state.

16. The apparatus of claim 1 wherein the finger grip is disposed adjacent to and along the backside of the display housing between opposing ends of the display housing.

17. The apparatus of claim 1 wherein the finger grip is formed by at least one of an edge of the palm housing and an edge of the keyboard housing.

18. The apparatus of claim 1 wherein the adjustable display housing support is adjustable to transition between a relatively flat configuration for storage in the recess and a tented configuration with a fold to extend outwardly from the recess for contact with the display housing.

* * * * *